Feb. 8, 1949.    H. H. TRAIL    2,460,956
COMBINED FRICTION AND JAW CLUTCH
Filed July 10, 1944    2 Sheets-Sheet 1
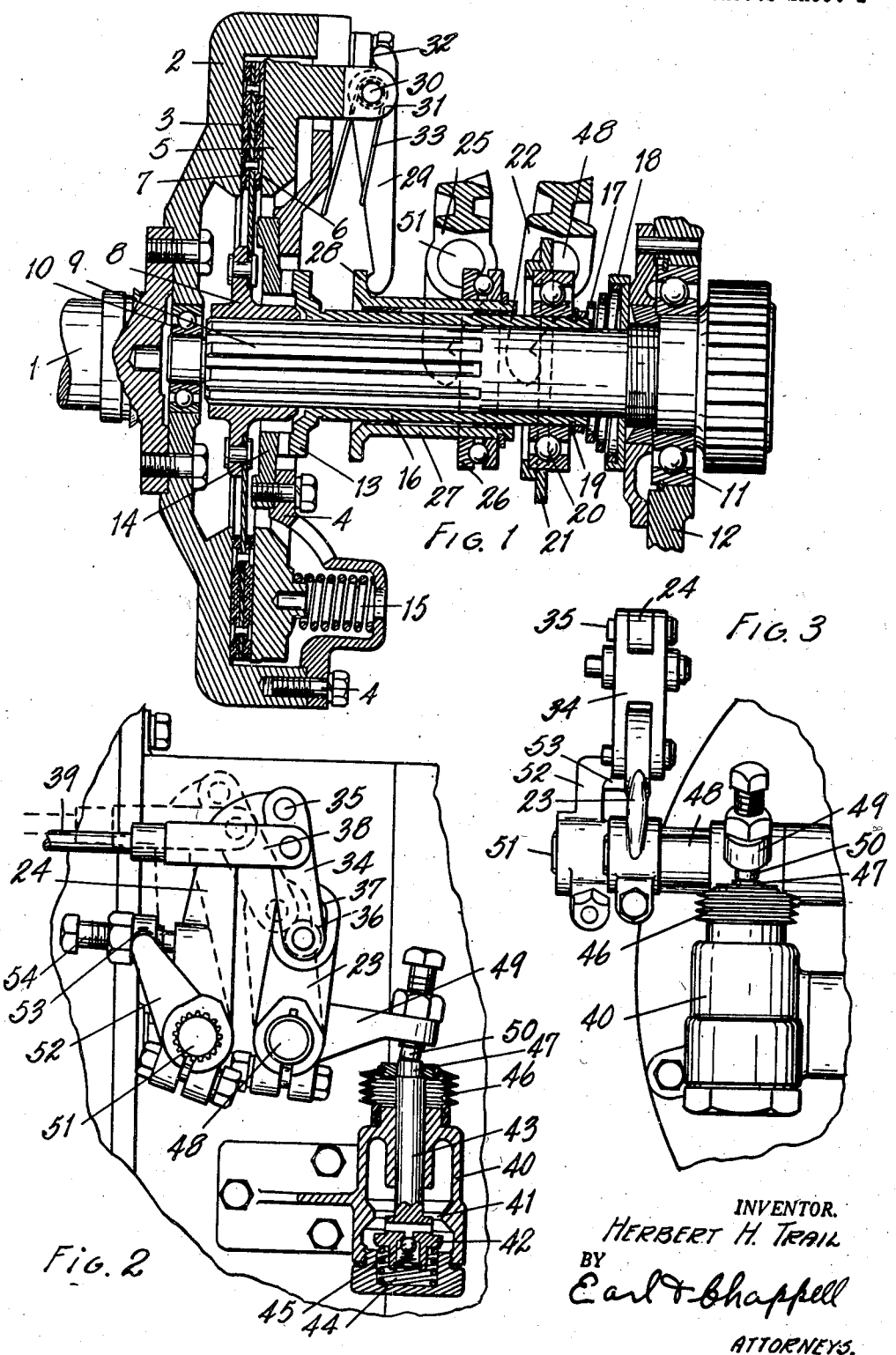
INVENTOR.
HERBERT H. TRAIL
BY
Earl & Chappell
ATTORNEYS.

Feb. 8, 1949.                    H. H. TRAIL                    2,460,956
                        COMBINED FRICTION AND JAW CLUTCH
Filed July 10, 1944                                          2 Sheets-Sheet 2

INVENTOR.
HERBERT H. TRAIL
BY Earl H. Shaffell
ATTORNEYS.

Patented Feb. 8, 1949

2,460,956

UNITED STATES PATENT OFFICE 2,460,956

COMBINED FRICTION AND JAW CLUTCH

Herbert H. Trail, Kalamazoo, Mich., assignor to Fuller Manufacturing Company, Kalamazoo, Mich.

Application July 10, 1944, Serial No. 544,276

17 Claims. (Cl. 192—53)

This invention relates to improvements in combined friction and jaw clutch.

The main objects of this invention are:

First, to provide a combined friction and jaw clutch which may be made in very compact form and at the same time is capable of transmitting heavy loads.

Second, to provide a combined friction and jaw clutch in which the driving and driven elements are effectively synchronized prior to the engagement of the jaw clutch.

Third, to provide a structure having these advantages which is operated from a single control such as a pedal.

Objects pertaining to details and economies of the invention will definitely appear from the description to follow. The invention is defined in the claims.

A structure which embodies the features of the invention is clearly illustrated in the accompanying drawing, in which:

Fig. 1 is a fragmentary view mainly in section of a combined friction and jaw clutch embodying my invention.

Fig. 2 is a fragmentary view with parts in vertical section showing details of the operating mechanism and the means for retarding the engagement of the jaw clutch relative to the engagement of the friction clutch.

Fig. 3 is a fragmentary elevation looking from the right of Fig. 2.

Figure 4:
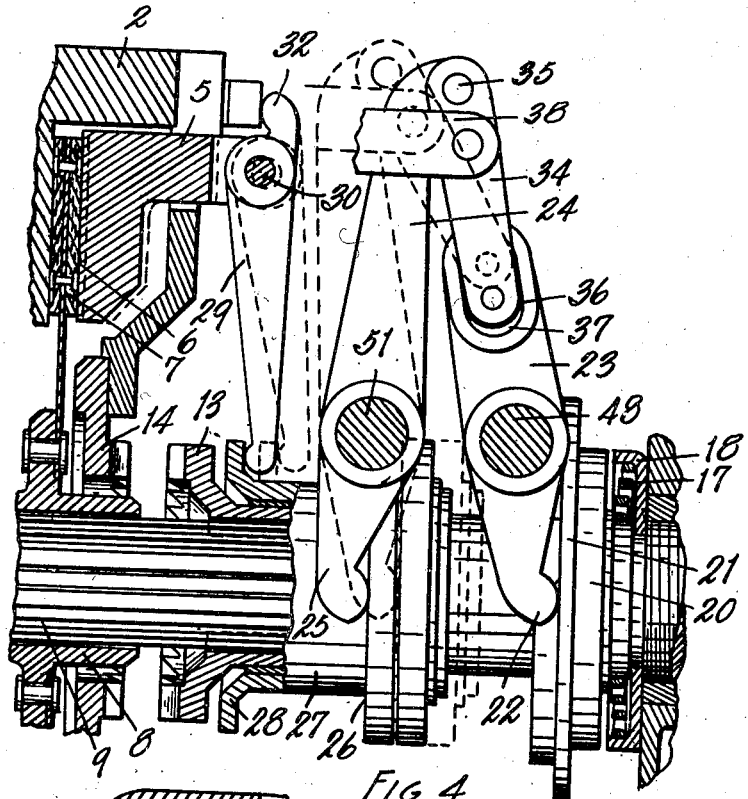
Fig. 4 is a fragmentary view corresponding to that of Fig. 1 with the jaw clutch in disengaged position and the friction clutch in engaged position.

In the embodiment of the invention illustrated in the accompanying drawing the crankshaft or input shaft 1 is connected to the driving member 2 of the clutch which has a friction face 3. The cover or face plate 4 is connected to rotate with the driving member as by means of screws 4'. The friction thrust member 5 is arranged within the cover plate and has a friction face 6 opposed to the friction face or surface 3 of the driving member and the driven friction disk 7 coacting with both of these friction faces. This driven friction disk is connected to the hub 8 splined to the driven shaft 9. The forward end of the driven shaft is supported by the bearing 10 while the rear end is supported by the bearing 11 in the housing or support 12.

The jaw clutch member 13 is splined to the driven shaft 9 for axial movement thereon and is adapted to coact with the jaw clutch member 14 carried by the cover plate 4. The thrust member 5 of the friction clutch is urged to engaging position by a plurality of coiled springs 15, one of which is shown in Fig. 1. The jaw clutch member 13 has an elongated hub or sleeve 16 slidable on the driven shaft 9 and is urged to engaging position by the helically coiled spring 17 arranged in a flanged holder or thrust member 18 and acting against the retaining ring 19 for the bearing 20 carrying the thrust collar 21 engaged by the yoke 22 of the actuating lever 23. The friction pressure plate or clutch member 5 is released through the lever 24 provided with the fork 25 coacting with the thrust collar 26 on the sleeve 27 which is slidably mounted on the hub or sleeve 16 of the jaw clutch member 13. This sleeve is provided with a flange 28 which engages a plurality of levers 29 pivoted at 30 on the ears 31 on the friction clutch member 5 and fulcrumed at 32 so that when the lever 24 is actuated the friction clutch member 5 is released. The levers 29 are provided with springs 33 acting to hold the levers against their fulcrums.

The levers 23 and 24 are connected by the link 34 pivoted on the lever 24 at 35 and provided with a roller 36 at its other end engaging the longitudinal slot 37 in the lever 23. The link is connected by the coupling 38 to the control rod 39. This control rod is connected to a suitable operating element such as a pedal. The forward or actuating movement of the rod 39 moves both the levers 23 and 24 forwardly, swinging their lower ends or yokes 22 and 26 rearwardly and, through the connections described, disengaging both the jaw clutch and the friction clutch. If the resistances offered for releasing the jaw and friction clutches are the same, both clutches are disengaged simultaneously, but if one of the clutches offers less resistance to be released than the other, the clutch that offers the lesser resistance is the first to be disengaged. Should a considerable driving torque be applied through the jaw clutch members at the moment desirable of releasing the same, the driving contact of the teeth may prevent disengagement; then the friction clutch members are the first to be released, they offering the least resistance, after which, when the driving torque is released from the jaw clutch teeth, the teeth of the driven clutch member snap out of engagement with the teeth of the driving clutch member. The friction clutch is approximately of the capacity of the engine torque and takes up the initial load and synchronizes the driving and driven shafts, after which the jaw clutch engages to permit the maximum torque requirements. The delayed or synchronized engagement of the jaw clutch is accomplished in the embodiment illustrated by the mechanism which will now be described.

The cylinder 40 is provided with a restriction 41 through which the piston 42 provided with a piston rod 43 is designed to pass. The piston is urged upwardly within the cylinder by means of the coiled spring 44 and is provided with a downwardly opening check valve 45 permitting the flow of liquid below the piston as it is moved upwardly above the restriction. A bellows packing 46 is provided for the piston rod or stem bearing 47. The lever 23 is keyed to its shaft 48 which is provided with an arm 49 carrying the adjustable tappet 50 coacting with the end of the piston rod 43 as shown in Fig. 2.

When the control element 39 is actuated the lever 23 is swung to the position indicated by dotted lines in Fig. 2 and this releases the piston 42 so that the spring actuates it to its position above the restriction 41, as stated, the fluid being by-passed through the check valve 45 when the control rod is released or returned to clutch engaging position. It is normally urged to that position by a spring, not shown, but well understood in the art. The lever 24 is positively returned to position to engage or permit the engagement of the friction clutch which has been disengaged against the tension of its engaging springs 15. The lost motion connection for the lever 23 to the link 34 permits the gradual return of the lever 23 to jaw clutch engaging position under the thrust of its engaging spring 17, the dashpot mechanism described counteracting the spring 17 and providing for delayed return of the lever 23, and consequently a delayed engagement of the jaw clutch relative to the friction clutch, thus permitting the effective synchronizing of the shafts 1 and 9 before the engagement of the jaw clutch. The timing of this jaw clutch engaging movement can be controlled by the space allowed between the piston and restricted area 41 which limits the space through which the fluid must pass from the upper part of the cylinder chamber to the lower part.

In Fig. 4 the parts are illustrated with the friction clutch engaged and the jaw clutch disengaged. The lever 24 is rotatable relative to its shaft 51, but is adjustably connected thereto by means of the arm 52 adjustably mounted on the shaft as shown in Fig. 2 and having a lateral offset 53 carrying the screw 54 which is adjustable in the offset and constitutes a tappet or thrust member for the lever as shown in Fig. 2. This provides for adjustment of the lever relative to its operating connection.

Figure 5:
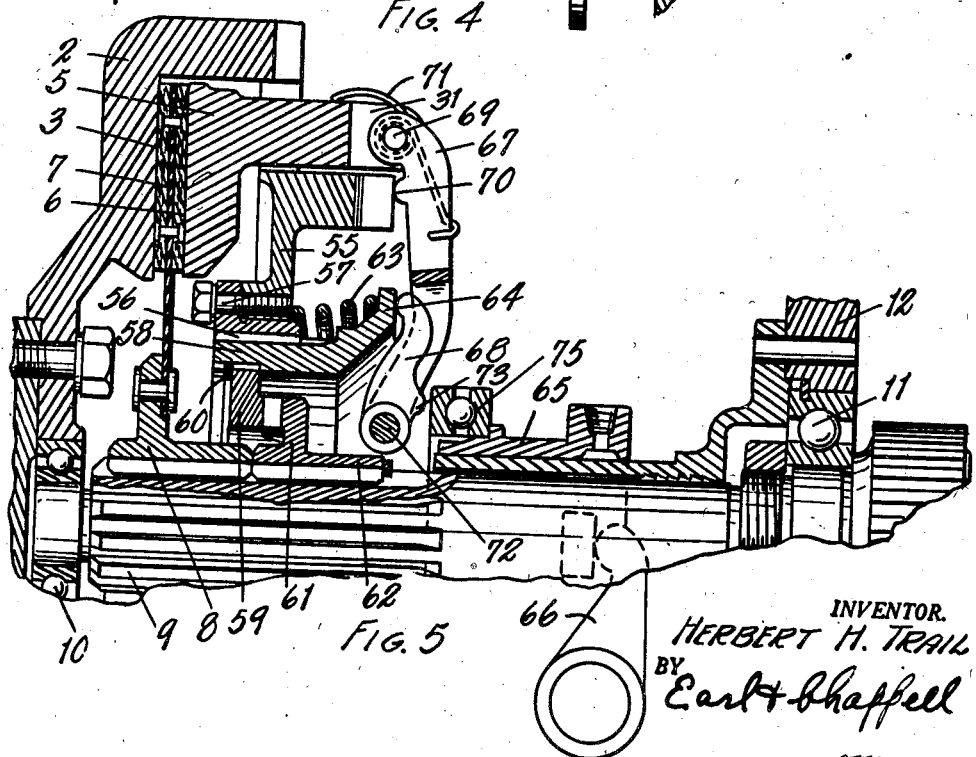
Fig. 5 is a fragmentary view mainly in section showing a somewhat modified form or embodiment of the invention.

In the embodiment of the invention shown in Fig. 5 the cover or face plate 55, corresponds to the cover or face plate 4 of the previously described embodiment. The internal spline member 56 is secured to the cover plate 55 as by means of screws 57. The tubular sleeve-like jaw carrying member 58 is splined to engage the member 56 and is slidable axially therein. The jaw clutch member 59 is secured within the member 58 as by means of the snap ring 60. The coacting jaw member 61 is keyed or splined to the shaft 9. The hub 62 of the jaw member 61 is secured to the shaft 9 by suitable splines or feathers. The hub 8 of the friction clutch 7 is likewise secured to the shaft 9 to rotate therewith.

The jaw clutch member 59 is urged to engaging position by the spring 63 supported at one end by the cover plate and at the other by the flange 64 on the member 58. The clutch throw-out or disengaging sleeve 65 is actuated by the yoke 66, the yoke being actuated by a suitable pedal or control connection to operate the release levers 67 and 68. The lever 67 is pivoted at 69 on the friction clutch element 5 and is provided with a post-like projection 70 engaging a suitable abutment on the cover plate. It will be understood that there is a plurality of these levers. The spring 71 normally urges the lever against the abutment.

The lever 68 is pivotally mounted at 72 on the swinging end of the lever 67 and is provided with a lobe 73 coacting with the shifting sleeve 65 and a lobe 74 coacting with the flange 64 on the jaw clutch shift member 58. In this embodiment I preferably connect the dashpot assembly described with the shifting yoke 38 to retard its movement in the clutch engaging direction.

In operation the forward movement of the sleeve 65 causes the thrust bearing 75 to engage the lobe 73 and actuate the release levers 67 and 68 to disengage the jaw clutch and the friction clutch, that clutch being disengaged first which offers the least resistance, at the same time actuating the release levers 67 and 68 to disengage the jaw clutch and the friction clutch, that clutch being disengaged first which offers the least resistance. As the spring 63 affords less resistance than do the friction clutch springs 15 (not shown in Fig. 5), upon engagement of the clutch resulting from the return movement of the yoke 66, the lever 68 pivoting on the lever 67 permits a rearward movement of the lever 67 and the engagement of the friction clutch. Thereafter, further movement of the throw-out sleeve 65 allows the upper end of the lever 68 to move rearwardly, thereby permitting the jaw clutch member 59 to be moved into engagement with its coacting member 61. The dashpot assembly described and connected to the yoke 66 or its operating mechanism times this delayed engagement of the jaw clutch relative to the friction clutch.

Structures embodying my invention are highly efficient and are particularly desirable where compactness is a factor. I have illustrated and described the invention in practical embodiments thereof. I have not attempted to illustrate and describe other adaptations as it is believed this disclosure will enable those skilled in the art to embody or adapt the invention as may be desired.

Having thus described my invention what I claim as new and desire to secure by Letters Patent is:

1. In a structure of the class described, the combination with a driven shaft, of a friction clutch comprising driving, driven and a coacting spring actuated thrust member, the driven member having driving connections with the driven shaft, the driving member being provided with a face plate, a driving jaw clutch member carried by said face plate, a coacting driven jaw clutch member slidable on and having driving engagement with said driven shaft and provided with an elongated sleeve, retracting levers for said friction clutch thrust member, a collar slidable on said driven jaw clutch member sleeve and operatively associated with said levers, a friction clutch releasing lever operatively associated with said collar, a jaw clutch releasing lever operatively associated with said sleeve of said driven jaw clutch member, a spring surrounding and carried by said shaft and acting to urge said driven jaw clutch member to engaged position, a link pivotally mounted on said friction clutch releasing lever and provided with a lost motion connection to said jaw clutch releasing lever, a control rod connected to said link adjacent its pivotal connection to said friction clutch releasing lever, a dashpot cylinder and coacting piston provided with a piston rod, said cylinder having an internal annular restriction through which said piston reciprocates on its stroke, said piston having a by-passing valve therein permitting liquid to flow through the piston on the outstroke thereof, a spring for actuating said piston on its outstroke, and a tappet operatively associated with said jaw clutch actuating lever to engage said piston rod whereby the return of the driven jaw clutch member to engaged position under the action of its return spring is retarded.

2. In a structure of the class described, the combination with a driven shaft, of a friction clutch comprising driving, driven and a coacting spring actuated thrust member, the driven member having driving connection with the driven shaft, the driving member being provided with a face plate, a driving jaw clutch member carried by said face plate, a coacting driven jaw clutch member slidable on and having driving engagement with said driven shaft and provided with an elongated sleeve, retracting levers for said friction clutch thrust member, a collar slidable on said driven jaw clutch member sleeve and operatively associated with said levers, a friction clutch releasing lever operatively associated with said collar, a jaw clutch releasing lever operatively associated with said sleeve of said driven jaw clutch member, a spring acting to urge said driven jaw clutch member to engaged position, a link pivotally mounted on said friction clutch releasing lever and provided with a lost motion connection to said jaw clutch releasing lever, a control rod connected to said link, a dashpot cylinder and coacting piston provided with a piston rod, said cylinder having an internal annular restriction through which said piston reciprocates on its stroke, said piston having a by-passing valve therein permitting liquid to flow through the piston on the outstroke thereof, a spring for actuating said piston on its outstroke, and means operatively associated with said jaw clutch actuating lever to engage said piston rod whereby the return of the driven jaw clutch member to engaged position under the action of its return spring is retarded.

3. In a structure of the class described, the combination with a driven shaft, of a friction clutch comprising driving, driven and a coacting spring actuated thrust member, the driven member having driving connection with the driven shaft, the driving member being provided with a face plate, a driving jaw clutch member carried by said face plate, a coacting driven jaw clutch member slidable on and having driving engagement with said driven shaft and provided with an elongated sleeve, retracting levers for said friction clutch thrust member, a collar slidable on said driven jaw clutch member sleeve and operatively associated with said levers, a friction clutch releasing lever operatively associated with said collar, a jaw clutch releasing lever operatively associated with said sleeve on said driven jaw clutch member, a spring surrounding and carried by said shaft and acting to urge said driven jaw clutch member to engaged position, a link pivotally mounted on said friction clutch releasing lever and provided with a lost motion connection to said jaw clutch releasing lever, a control rod connected to said link adjacent its pivotal connection to said friction clutch releasing lever, and means associated with said jaw clutch releasing lever for retarding the return thereof.

4. In a structure of the class described, the combination with a driven shaft, of a friction clutch comprising driving, driven and a coacting spring actuated thrust member, the driven member having driving connection with the driven shaft, the driving member being provided with a face plate, a driving jaw clutch member carried by said face plate, a coacting driven jaw clutch member slidable on and having driving engagement with said driven shaft and provided with an elongated sleeve, retracting levers for said friction clutch thrust member, a collar slidable on said driven jaw clutch member sleeve and operatively associated with said levers, a friction clutch releasing lever operatively associated with said collar, a jaw clutch releasing lever operatively associated with said sleeve of said driven jaw clutch member, a spring acting to urge said driven jaw clutch member to engaged position, a link pivotally mounted on said friction clutch releasing lever and provided with a lost motion connection to said jaw clutch releasing lever, a control rod connected to said link, and means associated with said jaw clutch releasing lever for retarding the return thereof.

5. In a structure of the class described, the combination with a driven shaft, of a friction clutch comprising driving, driven and a coacting spring actuated thrust member, the driven member having driving connection with the driven shaft, the driving member being provided with a face plate, a driving jaw clutch member carried by said face plate, a coacting driven jaw clutch member slidable on and having driving engagement with said driven shaft and provided with an elongated sleeve, retracting levers for said friction clutch thrust member, a collar slidable on said driven jaw clutch member sleeve and operatively associated with said levers, a friction clutch releasing lever operatively associated with said collar, a jaw clutch releasing lever operatively associated with said sleeve of said driven jaw clutch member, a spring surrounding and carried by said shaft and acting to urge said driven jaw clutch member to engaging position, a link pivotally mounted on said friction clutch releasing lever and provided with a lost motion connection to said jaw clutch releasing lever, a control rod connected to said link adjacent its pivotal connection to said friction clutch releasing lever, and a dashpot one member of which is operatively associated with said jaw clutch releasing lever to retard the return stroke thereof.

6. In a structure of the class described, the combination with a driven shaft, of a friction clutch comprising driving, driven and a coacting spring actuated thrust member, the driven member having driving connection with the driven shaft, the driving member being provided with a face plate, a driving jaw clutch member carried by said face plate, a coacting driven jaw clutch member slidable on and having driving engagement with said driven shaft and provided with an elongated sleeve, retracting levers for said friction clutch thrust member, a collar slidable on said driven jaw clutch member sleeve and operatively associated with said levers, a friction clutch releasing lever operatively associated with said collar, a jaw clutch releasing lever operatively associated with said sleeve of said driven jaw clutch member, a spring acting to urge said driven jaw clutch member to engaging position, a link pivotally mounted on said friction clutch releasing lever and provided with a lost motion connection to said jaw clutch releasing lever, a control rod connected to said link, and means for delaying re-engagement of said jaw clutch.

7. In a structure of the class described, the combination with a driven shaft, of a friction clutch comprising driving and driven members, the driven member having driving engagement with said shaft, a driving jaw clutch member, a coacting driven jaw clutch member having driving engagement with said driven shaft, a friction clutch releasing lever operatively connected to said friction clutch, a jaw clutch releasing lever to release the driven jaw clutch member from the driving jaw clutch member, a return spring for returning the driven jaw clutch member to clutch engaging position, a link pivotally mounted on said friction jaw clutch releasing lever and provided with a lost motion connection to said jaw clutch releasing lever, control means connected to said link whereby upon actuation thereof said releasing levers are both actuated, a dash pot cylinder and coacting piston provided with a piston rod, said cylinder having an internal annular restriction through which said piston reciprocates on its stroke, said piston having a by-passing valve therein permitting liquid to flow through the piston on the outstroke thereof, a spring for actuating said piston on its outstroke, and a tappet operatively associated with said jaw clutch releasing lever to engage said piston rod whereby the return of the driven jaw clutch member to engaged position under the action of its return spring is retarded.

8. In a structure of the class described, the combination with a driven shaft, of a friction clutch comprising driving and driven members, the driven member having driving engagement with said shaft, a driving jaw clutch member, a coacting driven jaw clutch member having driving engagement with said driven shaft, a friction clutch releasing lever operatively connected to said friction clutch, a jaw clutch releasing lever, a link pivotally mounted on said friction clutch releasing lever and provided with a lost motion connection to said jaw clutch releasing lever, control means connected to said link whereby upon actuation thereof said releasing levers are both actuated, and a dash pot, one member of which is operatively associated with said jaw clutch releasing lever to retard the return stroke thereof relative to the return stroke of the friction clutch releasing lever.

9. In a structure of the class described, the combination with a driven shaft, of a friction clutch comprising driving and driven members, the driven member having driving engagement with said shaft, a driving jaw clutch member, a coacting driven jaw clutch member having driving engagement with said driven shaft, a friction clutch releasing lever operatively connected to said friction clutch, a jaw clutch releasing lever, a link pivotally mounted on said friction clutch releasing lever and provided with a lost motion connection to said jaw clutch releasing lever, control means connected to said link whereby upon actuation thereof said releasing levers are both actuated, and means for retarding the return of said jaw clutch releasing lever.

10. In a structure of the class described, the combination with a driven shaft, of a friction clutch comprising driving and driven members, the driven member having driving connection with the driven shaft, a driving jaw clutch member, a coacting driven jaw clutch member having driving connection with said driven shaft, a friction clutch releasing lever operatively associated with said friction clutch, a jaw clutch releasing lever operatively associated with said driven jaw clutch member, common means for operating said clutch releasing levers to release both the friction and the jaw clutch members, said common means including a lost motion connection permitting either the friction clutch members or the jaw clutch members to be actuated first whichever offers the lesser resistance, and a dash pot operatively associated with said jaw clutch lever to retard the re-engagement of the jaw clutch relative to the engagement of the friction clutch.

11. In a structure of the class described, the combination with a driven shaft, of a friction clutch comprising driving and driven members, the driven member having driving connection with the driven shaft, a driving jaw clutch member, a coacting driven jaw clutch member having driving connection with said driven shaft, a spring for relatively operating the driving and driven jaw clutch members into driving engagement, a friction clutch releasing means including a lever operatively associated with said friction clutch driving and driven members, a jaw clutch releasing means including a lever operatively associated with said driving and driven jaw clutch members for releasing the same against the action of said spring, and a common means for operating said clutch releasing levers to release both the friction and the jaw clutch members, said common means including a lost motion connection permitting either the friction clutch members or the jaw clutch members to be disengaged first whichever offers the lesser resistance.

12. In a structure of the class described, the combination with a driven shaft, of a friction clutch comprising driving, driven and coacting thrust members, the driven member having driving connection with the driven shaft, a driving jaw clutch member, a coacting driven jaw clutch member releasably engageable with said driven jaw clutch member, a friction clutch releasing lever operatively associated with said friction clutch thrust member, a jaw clutch releasing lever operatively associated with said driven jaw clutch member, said jaw clutch lever having a longitudinal slot therein, a link pivotally mounted on said friction clutch releasing lever and engaged at its swinging end with said slot in said jaw clutch releasing lever, a control member connected to said link adjacent its pivot to said friction clutch releasing lever, a dash pot and coacting piston provided with a piston rod, said dash pot having an internal annular restriction through which the piston reciprocates on its stroke, a spring for actuating said piston on its outstroke, and an arm connected to said jaw clutch releasing lever and provided with an adjustable tappet cooperating with the piston rod, the parts coacting to delay the re-engagement of the jaw clutch relative to re-engagement of the friction clutch.

13. In a structure of the class described, the combination with a driven shaft, of a friction clutch comprising driving, driven and coacting thrust members, the driven member having driving connection with the driven shaft, a driving jaw clutch member, a coacting driven jaw clutch member releasably engageable with said driving jaw clutch member, a friction clutch releasing lever operatively associated with said friction clutch thrust member, a jaw clutch releasing lever operatively associated with said driven jaw clutch member, said jaw clutch lever having a longitudinal slot therein, a link pivotally mounted on said friction clutch releasing lever and engaged at its swinging end with said slot in said jaw clutch releasing lever, and a control member connected to said link adjacent its pivot to said friction clutch releasing lever.

14. In a structure of the class described, the combination with a driven shaft, of a friction clutch comprising driving and driven members, the driven member having driving connection to said shaft, a jaw clutch comprising a driving jaw clutch member and a coacting driven jaw clutch member having driving connections with said driven shaft, a friction clutch releasing lever operatively associated with said friction clutch, a jaw clutch releasing lever operatively associated with said jaw clutch common means for operating both said clutch releasing levers to release the friction and jaw clutch members, said common means including a lost motion connection to permit either the friction clutch members or the jaw clutch members to be actuated first whichever offers the lesser resistance, and automatic means for effecting re-engagement of the jaw clutch after re-engagement of the friction clutch when said actuating means is returned to its initial position.

15. In a structure of the class described, the combination with a driven shaft, of a friction clutch comprising driving and driven members, the driven member having driving connection to said shaft, a jaw clutch comprising a driving jaw clutch member and a coacting releasable driven jaw clutch member having driving connections with said driven shaft, a friction clutch releasing means, a jaw clutch releasing means, common means for operating both the friction clutch releasing means and the jaw clutch releasing means, to release the friction and jaw clutch members, said common means including means to permit either the friction clutch members or the jaw clutch members to be actuated first whichever offers the lesser resistance, and automatic means for effecting re-engagement of the jaw clutch after re-engagement of the friction clutch when said actuating means is returned to its initial position.

16. In a structure of the class described, the combination with a driven shaft, of a friction clutch comprising driving, driven and thrust clutch members, the driven member having driving connection to said driven shaft, a face plate carried by said driving member, an annular driving jaw clutch member having splined engagement with said face plate, a coacting driven jaw clutch member having driving connection with said driven shaft, a spring interposed between said face plate and driving jaw clutch member and acting to urge the same into engagement with the driven jaw clutch member, a releasing lever pivotally mounted on said friction thrust member and fulcrummed on said face plate and extending radially inwardly to adjacent the end of said driving jaw clutch member, a jaw clutch releasing lever pivotally mounted on the end of said releasing lever with its swinging end in engagement with said driving jaw clutch member, and a thrust collar adapted to engage said jaw clutch releasing lever intermediate its connection to said releasing lever and its point of engagement with said driving jaw clutch member.

17. In a structure of the class described, the combination with a driven shaft, of a friction clutch comprising driving, driven and thrust clutch members, the driven member having driving connection to said driven shaft, a face plate carried by said driving member, an annular driving jaw clutch member having splined engagement with said face plate, a coacting driven jaw clutch member having driving connection with said driven shaft, a spring acting to urge the driving jaw clutch member into engagement with the driven jaw clutch member, a releasing lever operatively associated with said friction thrust member, a jaw clutch releasing lever pivotally mounted on the end of said first lever with its swinging end in engagement with said driving jaw clutch member, and a thrust collar adapted to engage said jaw clutch releasing lever intermediate its connection to the first mentioned lever and its point of engagement with said driving jaw clutch member.

HERBERT H. TRAIL.

REFERENCES CITED

The following references are of record in the file of this patent:

UNITED STATES PATENTS

| Number | Name | Date |
|---|---|---|
| Re. 14,806 | Neville | Feb. 17, 1920 |
| 296,892 | Thomson | Apr. 15, 1884 |
| 835,721 | Winton | Nov. 13, 1906 |
| 920,203 | Smith | May 4, 1909 |
| 1,024,595 | Noyes | Apr. 30, 1912 |
| 1,844,286 | Joseph | Feb. 9, 1932 |

FOREIGN PATENTS

| Number | Country | Date |
|---|---|---|
| 108,515 | Great Britain | Aug. 7, 1917 |
| 124,226 | Great Britain | Mar. 27, 1919 |